(12) United States Patent
Lindner

(10) Patent No.: US 8,700,081 B2
(45) Date of Patent: *Apr. 15, 2014

(54) DETERMINING WHETHER TO SWITCH BETWEEN GROUP CALLS BASED ON PRIORITY WITHIN A WIRELESS COMMUNICATIONS SYSTEM

(75) Inventor: Mark A. Lindner, Superior, CO (US)

(73) Assignee: QUALCOMM Incorporated, San Diego, CA (US)

( * ) Notice: Subject to any disclaimer, the term of this patent is extended or adjusted under 35 U.S.C. 154(b) by 880 days.

This patent is subject to a terminal disclaimer.

(21) Appl. No.: 12/720,403

(22) Filed: Mar. 9, 2010

(65) Prior Publication Data

US 2010/0246535 A1 Sep. 30, 2010

Related U.S. Application Data

(60) Provisional application No. 61/164,626, filed on Mar. 30, 2009.

(51) Int. Cl.
*H04B 7/00* (2006.01)

(52) U.S. Cl.
USPC ....... 455/518; 455/512; 455/435.3; 455/90.2; 455/78; 455/79; 455/416; 370/395.42; 370/352; 370/338

(58) Field of Classification Search
USPC .............. 455/518, 517, 519, 500, 512, 435.3, 455/90.2, 78, 79, 426.1, 412.1; 370/395.42, 370/352, 389, 338, 328
See application file for complete search history.

(56) References Cited

U.S. PATENT DOCUMENTS

| | | | |
|---|---|---|---|
| 6,912,401 B2 | 6/2005 | Rosen et al. | |
| 7,289,822 B2 | 10/2007 | Rosen et al. | |
| 8,224,366 B2 | 7/2012 | Reich et al. | |
| 2004/0005904 A1 | 1/2004 | Wolf et al. | |
| 2007/0049314 A1 | 3/2007 | Balachandran et al. | |
| 2008/0146203 A1 | 6/2008 | Khawand et al. | |
| 2008/0155689 A1 | 6/2008 | Denninghoff et al. | |
| 2009/0080360 A1 | 3/2009 | Song | |
| 2010/0016008 A1* | 1/2010 | Brewer et al. | 455/518 |

FOREIGN PATENT DOCUMENTS

| | | |
|---|---|---|
| JP | 2003086233 A | 3/2003 |
| WO | 2005036802 A2 | 4/2005 |
| WO | WO2010009265 | 1/2010 |

OTHER PUBLICATIONS

International Search Report and Written Opinion—PCT/US2010/029123, International Search Authority—European Patent Office—Aug. 16, 2010.
European Search Report—EP12173021—Search Authority—Munich—Jul. 26, 2012.

* cited by examiner

*Primary Examiner* — Shaima Q Aminzay
(74) *Attorney, Agent, or Firm* — Raphael Freiwirth

(57) ABSTRACT

Embodiments of the present invention are directed to determining whether to switch between group calls based on priority within a wireless communications system. In an embodiment, an announce message is received at a given access terminal that announces a second group session when the given access terminal is participating in the first group session. The given access terminal acquires one or more priority levels associated with one or more of the first and second group sessions. The access terminal determines whether to switch from the first group session to the second group session based on the one or more priority levels. The access terminal selectively switches from the first group session to the second group session based on the determination.

26 Claims, 5 Drawing Sheets

DETERMINING WHETHER TO SWITCH BETWEEN GROUP CALLS BASED ON PRIORITY WITHIN A WIRELESS COMMUNICATIONS SYSTEM

CLAIM OF PRIORITY UNDER 35 U.S.C. §119

The present Application for Patent claims priority to Provisional Application No. 61/164,626 entitled "DETERMINING WHETHER TO SWITCH BETWEEN GROUP CALLS BASED ON PRIORITY WITHIN A WIRELESS COMMUNICATIONS SYSTEM" filed on Mar. 30, 2009, which is incorporated herein by reference in its entirety.

BACKGROUND OF THE INVENTION

1. Field of the Invention

Embodiments of the present invention are directed to determining whether to switch between group calls based on priority within a wireless communications system.

2. Description of the Related Art

Wireless communication systems have developed through various generations, including a first-generation analog wireless phone service (1G), a second-generation (2G) digital wireless phone service (including interim 2.5G and 2.75G networks) and a third-generation (3G) high speed data/Internet-capable wireless service. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

The method for providing CDMA mobile communications was standardized in the United States by the Telecommunications Industry Association/Electronic Industries Association in TIA/EIA/IS-95-A entitled "Mobile Station-Base Station Compatibility Standard for Dual-Mode Wideband Spread Spectrum Cellular System," referred to herein as IS-95. Combined AMPS & CDMA systems are described in TIA/EIA Standard IS-98. Other communications systems are described in the IMT-2000/UM, or International Mobile Telecommunications System 2000/Universal Mobile Telecommunications System, standards covering what are referred to as wideband CDMA (WCDMA), CDMA2000 (such as CDMA2000 1xEV-DO standards, for example) or TD-SCDMA.

In wireless communication systems, mobile stations, handsets, or access terminals (AT) receive signals from fixed position base stations (also referred to as cell sites or cells) that support communication links or service within particular geographic regions adjacent to or surrounding the base stations. Base stations provide entry points to an access network (AN)/radio access network (RAN), which is generally a packet data network using standard Internet Engineering Task Force (IETF) based protocols that support methods for differentiating traffic based on Quality of Service (QoS) requirements. Therefore, the base stations generally interact with ATs through an over the air interface and with the AN through Internet Protocol (IP) network data packets.

In wireless telecommunication systems, Push-to-talk (PTT) capabilities are becoming popular with service sectors and consumers. PTT can support a "dispatch" voice service that operates over standard commercial wireless infrastructures, such as CDMA, FDMA, TDMA, GSM, etc. In a dispatch model, communication between endpoints (ATs) occurs within virtual groups, wherein the voice of one "talker" is transmitted to one or more "listeners." A single instance of this type of communication is commonly referred to as a dispatch call, or simply a PTT call. A PTT call is an instantiation of a group, which defines the characteristics of a call. A group in essence is defined by a member list and associated information, such as group name or group identification.

Conventionally, data packets within a wireless communications network have been configured to be sent to a single destination or access terminal. A transmission of data to a single destination is referred to as "unicast". As mobile communications have increased, the ability to transmit given data concurrently to multiple access terminals has become more important. Accordingly, protocols have been adopted to support concurrent data transmissions of the same packet or message to multiple destinations or target access terminals. A "broadcast" refers to a transmission of data packets to all destinations or access terminals (e.g., within a given cell, served by a given service provider, etc.), while a "multicast" refers to a transmission of data packets to a given group of destinations or access terminals. In an example, the given group of destinations or "multicast group" may include more than one and less than all of possible destinations or access terminals (e.g., within a given group, served by a given service provider, etc.). However, it is at least possible in certain situations that the multicast group comprises only one access terminal, similar to a unicast, or alternatively that the multicast group comprises all access terminals (e.g., within a cell or sector), similar to a broadcast.

Broadcasts and/or multicasts may be performed within wireless communication systems in a number of ways, such as performing a plurality of sequential unicast operations to accommodate the multicast group, allocating a unique broadcast/multicast channel (BCH) for handling multiple data transmissions at the same time and the like. A conventional system using a broadcast channel for push-to-talk communications is described in United States Patent Application Publication No. 2007/0049314 dated Mar. 1, 2007 and entitled "Push-To-Talk Group Call System Using CDMA 1x-EVDO Cellular Network", the contents of which are incorporated herein by reference in its entirety. As described in Publication No. 2007/0049314, a broadcast channel can be used for push-to-talk calls using conventional signaling techniques. Although the use of a broadcast channel may improve bandwidth requirements over conventional unicast techniques, the conventional signaling of the broadcast channel can still result in additional overhead and/or delay and may degrade system performance.

The $3^{rd}$ Generation Partnership Project 2 ("3GPP2") defines a broadcast-multicast service (BCMCS) specification for supporting multicast communications in CDMA2000 networks. Accordingly, a version of 3GPP2's BCMCS specification, entitled "CDMA2000 High Rate Broadcast-Multicast Packet Data Air Interface Specification", dated Feb. 14, 2006, Version 1.0 C.S0054-A, is hereby incorporated by reference in its entirety.

SUMMARY

Embodiments of the present invention are directed to determining whether to switch between group calls based on priority within a wireless communications system. In an embodiment, an announce message is received at a given access terminal that announces a second group session when the given access terminal is participating in the first group session. The given access terminal acquires one or more priority levels associated with one or more of the first and second group sessions. The access terminal determines whether to switch from the first group session to the second group session based on the one or more priority levels. The access terminal selectively switches from the first group session to the second group session based on the determination.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION

Figure 1:
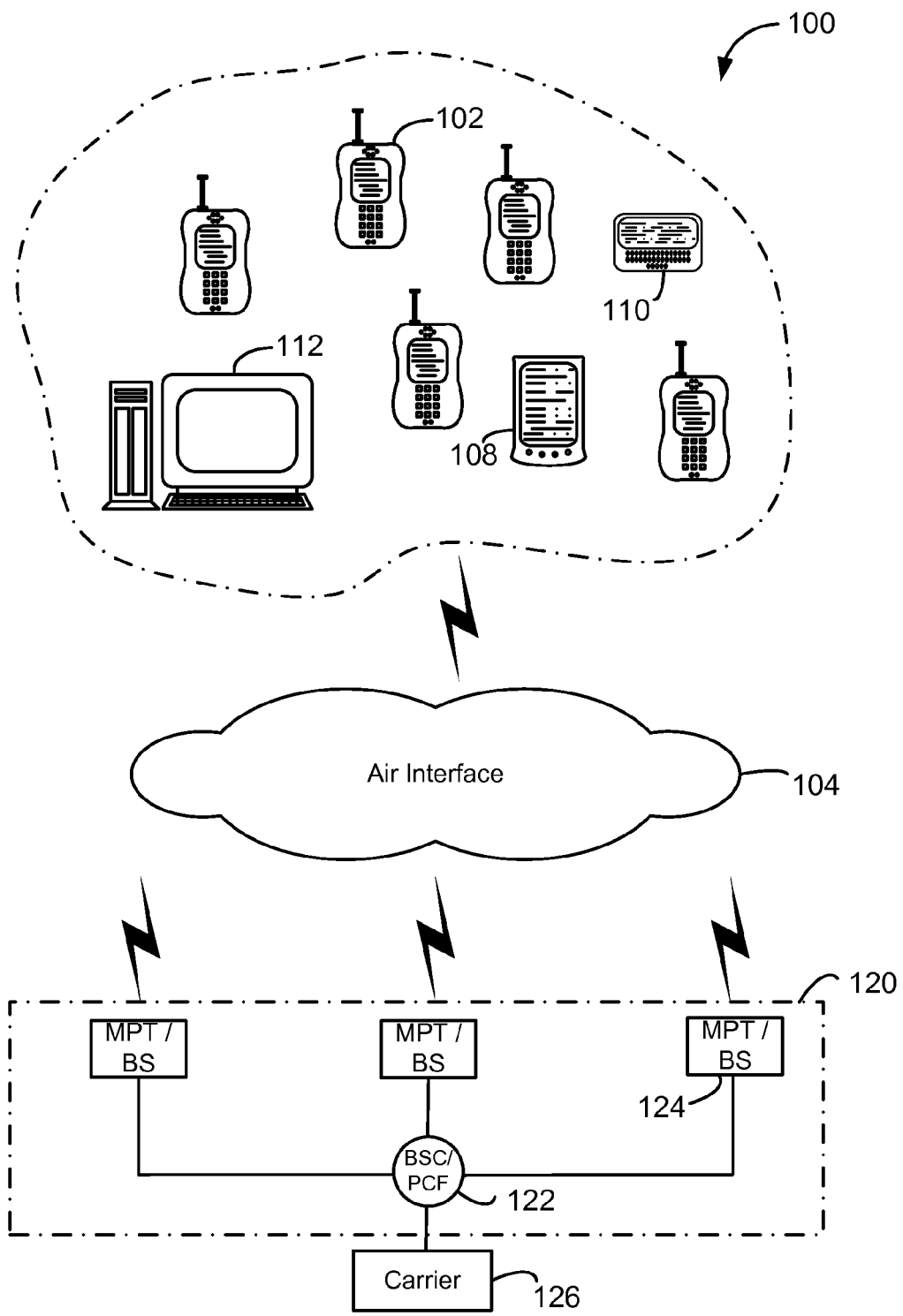
FIG. 1 is a diagram of a wireless network architecture that supports access terminals and access networks in accordance with at least one embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A High Data Rate (HDR) subscriber station, referred to herein as an access terminal (AT), may be mobile or stationary, and may communicate with one or more HDR base stations, referred to herein as modem pool transceivers (MPTs) or base stations (BS). An access terminal transmits and receives data packets through one or more modem pool transceivers to an HDR base station controller, referred to as a modem pool controller (MPC), base station controller (BSC) and/or packet control function (PCF). Modem pool transceivers and modem pool controllers are parts of a network called an access network. An access network transports data packets between multiple access terminals.

The access network may be further connected to additional networks outside the access network, such as a corporate intranet or the Internet, and may transport data packets between each access terminal and such outside networks. An access terminal that has established an active traffic channel connection with one or more modem pool transceivers is called an active access terminal, and is said to be in a traffic state. An access terminal that is in the process of establishing an active traffic channel connection with one or more modem pool transceivers is said to be in a connection setup state. An access terminal may be any data device that communicates through a wireless channel or through a wired channel, for example using fiber optic or coaxial cables. An access terminal may further be any of a number of types of devices including but not limited to PC card, compact flash, external or internal modem, or wireless or wireline phone. The communication link through which the access terminal sends signals to the modem pool transceiver is called a reverse link or traffic channel. The communication link through which a modem pool transceiver sends signals to an access terminal is called a forward link or traffic channel. As used herein the term traffic channel can refer to either a forward or reverse traffic channel.

FIG. 1 illustrates a block diagram of one exemplary embodiment of a wireless system 100 in accordance with at least one embodiment of the invention. System 100 can contain access terminals, such as cellular telephone 102, in communication across an air interface 104 with an access network or radio access network (RAN) 120 that can connect the access terminal 102 to network equipment providing data connectivity between a packet switched data network (e.g., an intranet, the Internet, and/or carrier network 126) and the access terminals 102, 108, 110, 112. As shown here, the access terminal can be a cellular telephone 102, a personal digital assistant 108, a pager 110, which is shown here as a two-way text pager, or even a separate computer platform 112 that has a wireless communication portal. Embodiments of the invention can thus be realized on any form of access terminal including a wireless communication portal or having wireless communication capabilities, including without limitation, wireless modems, PCMCIA cards, personal computers, telephones, or any combination or sub-combination thereof. Further, as used herein, the terms "access terminal", "wireless device", "client device", "mobile terminal" and variations thereof may be used interchangeably.

Referring back to FIG. 1, the components of the wireless network 100 and interrelation of the elements of the exemplary embodiments of the invention are not limited to the configuration illustrated. System 100 is merely exemplary and can include any system that allows remote access terminals, such as wireless client computing devices 102, 108, 110, 112 to communicate over-the-air between and among each other and/or between and among components connected via the air interface 104 and RAN 120, including, without limitation, carrier network 126, the Internet, and/or other remote servers.

The RAN 120 controls messages (typically sent as data packets) sent to a base station controller/packet control function (BSC/PCF) 122. The BSC/PCF 122 is responsible for signaling, establishing, and tearing down bearer channels (i.e., data channels) between a packet data service node 100 ("PDSN") and the access terminals 102/108/110/112. If link layer encryption is enabled, the BSC/PCF 122 also encrypts the content before forwarding it over the air interface 104. The function of the BSC/PCF 122 is well-known in the art and will not be discussed further for the sake of brevity. The carrier network 126 may communicate with the BSC/PCF 122 by a network, the Internet and/or a public switched telephone network (PSTN). Alternatively, the BSC/PCF 122 may connect directly to the Internet or external network. Typically, the network or Internet connection between the carrier network 126 and the BSC/PCF 122 transfers data, and the PSTN transfers voice information. The BSC/PCF 122 can be connected to multiple base stations (BS) or modem pool transceivers (MPT) 124. In a similar manner to the carrier network, the BSC/PCF 122 is typically connected to the MPT/BS 124 by a network, the Internet and/or PSTN for data transfer and/or voice information. The MPT/BS 124 can broadcast data messages wirelessly to the access terminals, such as cellular telephone 102. The MPT/BS 124, BSC/PCF 122 and other components may form the RAN 120, as is known in the art. However, alternate configurations may also be used and the invention is not limited to the configuration illustrated. For example, in another embodiment the functionality of the BSC/PCF 122 and one or more of the MPT/BS 124 may be collapsed into a single "hybrid" module having the functionality of both the BSC/PCF 122 and the MPT/BS 124.

Figure 2:
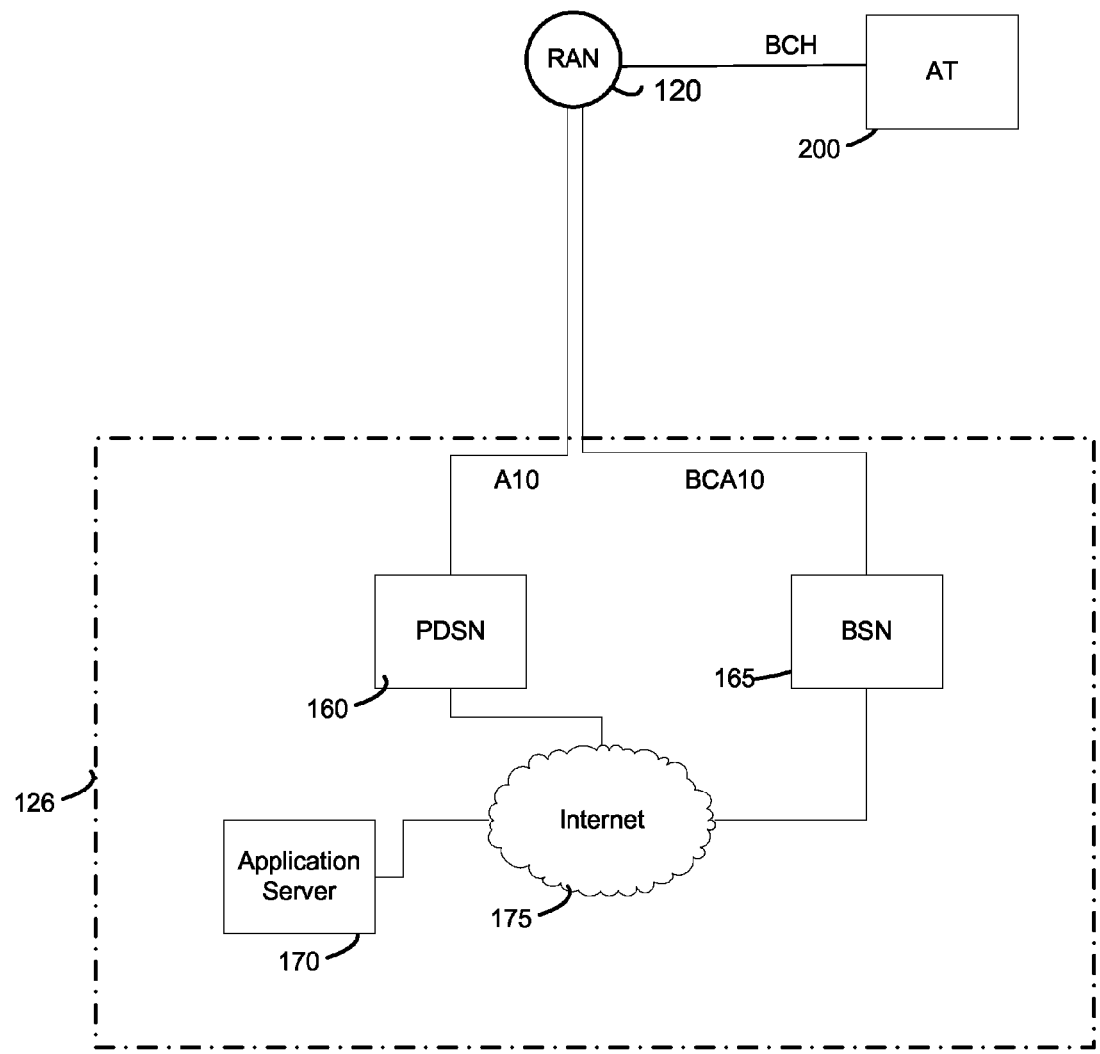
FIG. 2 illustrates the carrier network according to an example embodiment of the present invention.

FIG. 2 illustrates the carrier network 126 according to an embodiment of the present invention. In the embodiment of FIG. 2, the carrier network 126 includes a packet data serving node (PDSN) 160, a broadcast serving node (BSN) 165, an application server 170 and an Internet 175. However, application server 170 and other components may be located outside the carrier network in alternative embodiments. The PDSN 160 provides access to the Internet 175, intranets and/or remote servers (e.g., application server 170) for mobile stations (e.g., access terminals, such as 102, 108, 110, 112 from FIG. 1) utilizing, for example, a cdma2000 Radio Access Network (RAN) (e.g., RAN 120 of FIG. 1). Acting as an access gateway, the PDSN 160 may provide simple IP and mobile IP access, foreign agent support, and packet transport. The PDSN 160 can act as a client for Authentication, Authorization, and Accounting (AAA) servers and other supporting infrastructure and provides mobile stations with a gateway to the IP network as is known in the art. As shown in FIG. 2, the PDSN 160 may communicate with the RAN 120 (e.g., the BSC/PCF 122) via a conventional A10 connection. The A10 connection is well-known in the art and will not be described further for the sake of brevity.

Referring to FIG. 2, the broadcast serving node (BSN) 165 may be configured to support multicast and broadcast services. The BSN 165 will be described in greater detail below. The BSN 165 communicates with the RAN 120 (e.g., the BSC/PCF 122) via a broadcast (BC) A10 connection, and with the application server 170 via the Internet 175. The BCA10 connection is used to transfer group (e.g., multicast and/or broadcast) messaging. Accordingly, the application server 170 sends unicast messaging to the PDSN 160 via the Internet 175, and sends group messaging to the BSN 165 via the Internet 175.

Generally, as will be described in greater detail below, the RAN 120 transmits group messages, received from the BSN 165 via the BCA10 connection, over a broadcast channel (BCH) of the air interface 104 to one or more access terminals 200.

Figure 3:
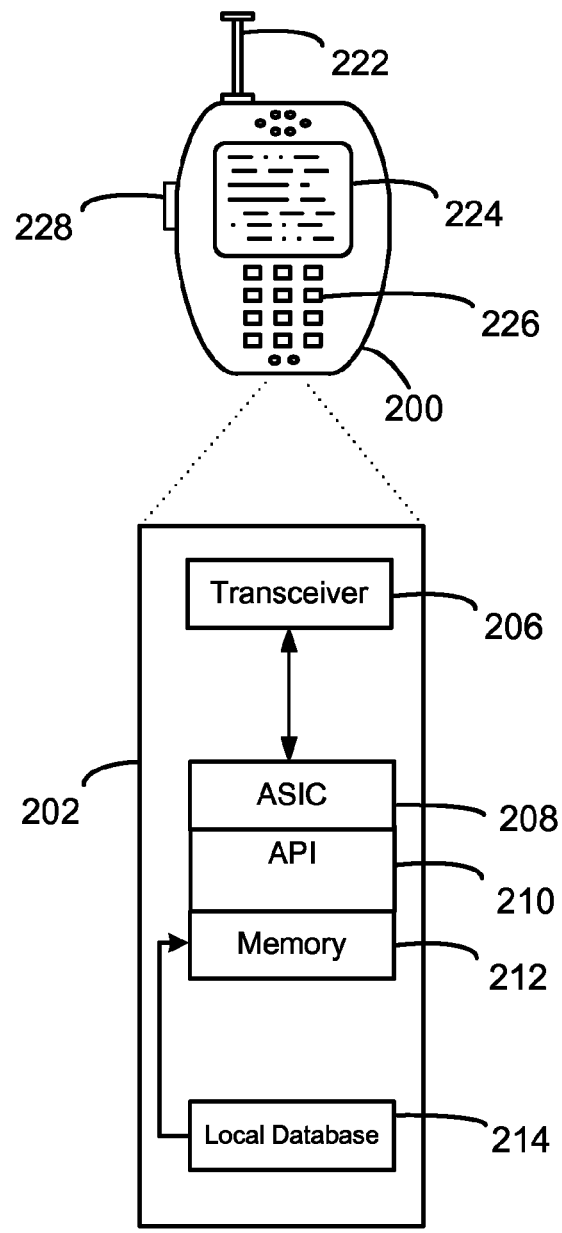
FIG. 3 is an illustration of an access terminal in accordance with at least one embodiment of the invention.

Referring to FIG. 3, an access terminal 200, (here a wireless device), such as a cellular telephone, has a platform 202 that can receive and execute software applications, data and/or commands transmitted from the RAN 120 that may ultimately come from the carrier network 126, the Internet and/or other remote servers and networks. The platform 202 can include a transceiver 206 operably coupled to an application specific integrated circuit ("ASIC" 208), or other processor, microprocessor, logic circuit, or other data processing device. The ASIC 208 or other processor executes the application programming interface ("API') 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can hold applications not actively used in memory 212. The local database 214 is typically a flash memory cell, but can be any secondary storage device as known in the art, such as magnetic media, EEPROM, optical media, tape, soft or hard disk, or the like. The internal platform 202 components can also be operably coupled to external devices such as antenna 222, display 224, push-to-talk button 228 and keypad 226 among other components, as is known in the art.

Accordingly, an embodiment of the invention can include an access terminal including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the access terminal in FIG. 3 are to be considered merely illustrative and the invention is not limited to the illustrated features or arrangement.

The wireless communication between the access terminal 102 and the RAN 120 can be based on different technologies, such as code division multiple access (CDMA), WCDMA, time division multiple access (TDMA), frequency division multiple access (FDMA), Orthogonal Frequency Division Multiplexing (OFDM), the Global System for Mobile Communications (GSM), or other protocols that may be used in a wireless communications network or a data communications network. The data communication is typically between the client device 102, MPT/BS 124, and BSC/PCF 122. The BSC/PCF 122 can be connected to multiple data networks such as the carrier network 126, PSTN, the Internet, a virtual private network, and the like, thus allowing the access terminal 102 access to a broader communication network. As discussed in the foregoing and known in the art, voice transmission and/or data can be transmitted to the access terminals from the RAN using a variety of networks and configurations. Accordingly, the illustrations provided herein are not intended to limit the embodiments of the invention and are merely to aid in the description of aspects of embodiments of the invention.

Figure 4:
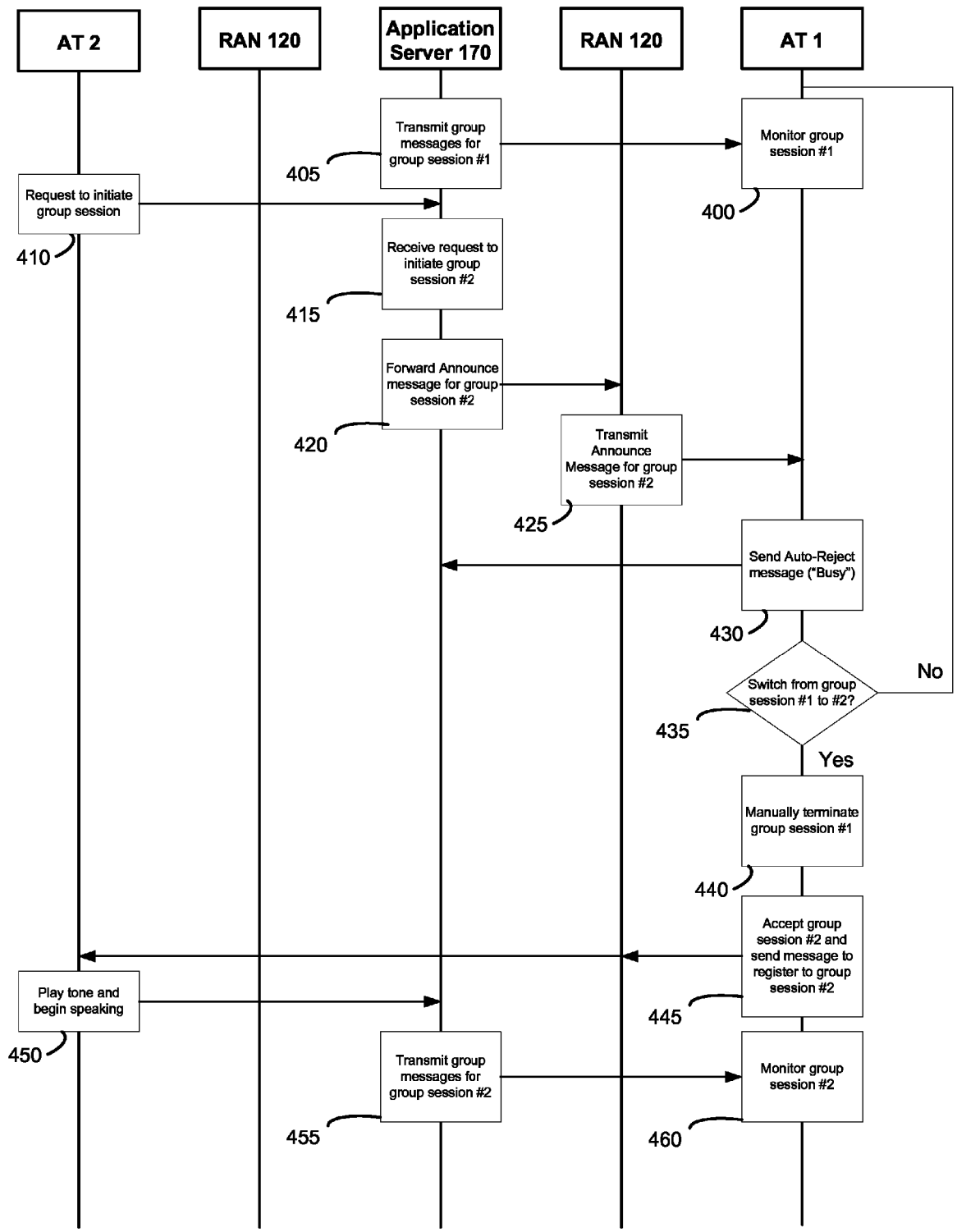
FIG. 4 illustrates a conventional manner of switching between group sessions.

FIG. 4 illustrates a conventional manner of switching between group sessions. In particular, FIG. 4 illustrates a switch from a first, currently active group session to a later announced second group session at an access terminal. Accordingly, assume that a given AT ("AT 1") has accepted and registered to the first group session (e.g., a push-to-talk (PTT) session), and AT 1 monitors (e.g., or talks, if AT 1 is the current floor-holder), 400, group messages associated with the first group session from one or more other ATs (not shown) and forwarded by the application server 170 for transmission at the RAN 120, 405, at least within AT 1's sector on a downlink broadcast channel (BCH).

At some point during the first group session, another AT ("AT 2") sends a message requesting initiation of a second group session, 410. For example, a user of AT 2 may push a PTT button at AT 2, which triggers a PTT call request message to be transmitted on a reverse link access channel to the RAN 120, which is in turn forwarded to the application server 170. In 415, the application server 170 receives a request to initiate the second group session from call initiator AT 2.

The application server 170 forwards an announce message, for announcing the second group session to a plurality of targets, to the RAN 120, 420 (e.g., via the PDSN 160 or BSN 165). It may be assumed that AT 1 belongs to a group associated with the second group session in the description of FIG. 4, such that AT 1 is a target AT for the announce message. As such, the RAN 120 transmits the announce message announcing the second group session at least within AT 1's sector, 425.

Conventional group communication protocols (e.g., such as PTT protocols, PTX protocols, broadcast and multicast service (BCMCS) protocols, etc.) do not provide a call waiting feature or other manner of switching between group calls. Accordingly, upon receiving the announce message announcing the second group session, AT 1 responds with an auto-reject message indicating a "busy" status, 430. As will be appreciated, a user of AT 1 has no option of accepting the call at this point, because AT 1 is configured to automatically respond to the group announce message with a rejection due to AT 1's status as active in the first group session.

Still, in 430, AT 1 is notified that the second group session was announced and auto-rejected. Thus, in 435, a user of AT 1 determines whether to manually switch from the first group session to the second group session. It is noted that AT 1 itself does not make this determination, as AT 1 is defaulted to simply reject incoming group announces when AT 1 is already engaged in another group session. If the user of AT 1 determines to remain in the first group session in 435, the process returns to 400. Otherwise, if the user of AT 1 determines to switch from the first group session to the second group session in 435, AT 1 manually terminates the first group session, 440, and manually requests to join the second group session by sending, 445 a registration message, and a message accepting the announce message (e.g., ANNOUNCE ACK) to the application server 170 (e.g., which is relayed via the RAN 120) (e.g., if the group session corresponds to an IP multicasting session, the registration message may correspond to a BCMCSFlowRegistration message sent to the RAN 120).

Assuming AT 1 is a first responder to the second group session at this point, upon receiving the ANNOUNCE ACK, the application server 170 sends a message instructing AT 2 to begin speaking, and AT 2 receives the message and plays a tone indicating to a user of AT 2 that the second group session has begun and the user can begin speaking, 450. Thus, in 450, the user of AT 2 begins speaking and relaying voice packets (e.g., or other data, as in a push-to-transfer (PTX) system that can transfer any type of digital data) to the application server 170, which in turn forwards the voice packets to the RAN 120 for transmission at least within AT 1's sector on the downlink BCH, 455. AT 1 monitors the downlink BCH and receives the group transmissions associated with the second group session, 460.

As will be appreciated in view of the above-description of FIG. 4, ATs complying with conventional group communication protocols, such as protocols related to PTT, PTX and/or BCMCS, are configured to auto-reject announce messages when another group session is already active (e.g., see 430 of FIG. 4). Thus, irrespective of the relative importance of the more recently announced group session, a conventional AT does not have the option of switching group sessions without a manual decision and enforcement by the user of the AT.

Figure 5:
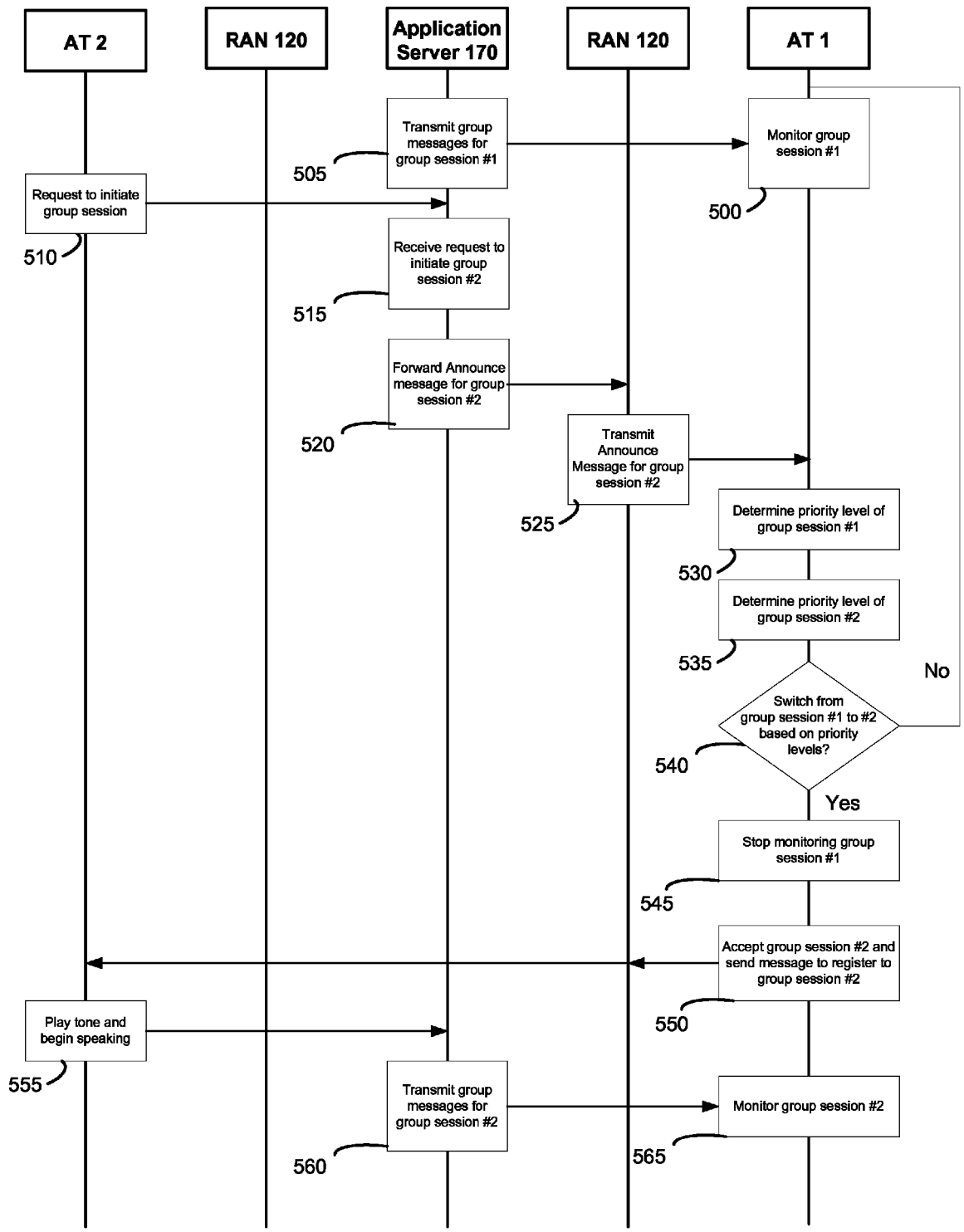
FIG. 5 illustrates a process for switching between group sessions based on one or more associated priority levels according to an embodiment of the present invention.

FIG. 5 illustrates a process for switching between group sessions based on one or more associated priority levels according to an embodiment of the present invention. In particular, FIG. 5 illustrates a switch from a first, currently active group session to a later announced second group session based on associated priority levels. Accordingly, assume that a given AT ("AT 1") has accepted and registered to the first group session (e.g., a PTT session, a PTX session, a BCMCS session, etc.), and AT 1 monitors, 500, group messages associated with the first group session from one or more other ATs (not shown) and forwarded by the application server 170 for transmission at the RAN 120, 505, at least within AT 1's sector on the downlink BCH.

At some point during the first group session, another AT ("AT 2") sends a message requesting initiation of a second group session, 510. For example, a user of AT 2 may push a PTT button at AT 2, which triggers a PTT call request message to be transmitted on a reverse link access channel to the RAN 120, which is in turn forwarded to the application server 170. In 515, the application server 170 receives a request to initiate the second group session from call initiator AT 2.

The application server 170 forwards an announce message, for announcing the second group session a plurality of access terminals, to the RAN 120, 520 (e.g., via the PDSN 160 or BSN 165). It may be assumed that AT 1 belongs to a group associated with the second group session in the description of FIG. 5, such that AT 1 is a target AT for the announce message. As such, the RAN 120 transmits the announce message announcing the second group session at least within AT 1's sector, 525 (e.g., on a downlink shared channel if the group session is supported by IP multicasting protocols, or via separate messages addressed to specific target ATs if the group session is supported by IP unicasting protocols).

Instead of simply responding to the announce message with an auto-reject message indicating that AT 1 is busy (i.e., engaged in another group call), AT 1 determines a first priority level associated with the first group session, 530, and also determines a second priority level associated with the second group session, 535. For example, the first and second priority levels determined in 530 and 535, respectively, can be based on one or more priority rules contained within a priority profile contained in local memory at AT 1. In an example, the priority profile can be established prior to receipt of the announce message at AT 1. In another example, the priority levels determined in 530 and/or 535 can be received from an external network entity (e.g., the RAN 120, the application server 170, etc.). In another example, AT 1 may dynamically calculate the priority levels in 530 and/or 535, instead of and/or in addition to storing fixed priority values in local memory. The dynamic calculation could alternatively be performed at the external network entity and then conveyed to AT 1. It will be further appreciated that the manner in which the priority level of 530 is established need not be the same as the manner in which the priority level of 535 is established. Thus, the priority levels of 530 and/or 535 can either be system-defined (e.g., by the external network entity), or user-defined (e.g., by a user of AT 1).

While not shown explicitly in FIG. 5, 535 can include an initial computation of the priority level for the second group session that is based on the announce message received at 525, followed by supplemental information from the application server 170 that can further affect the priority level. For example, the application server 170 can forward information to AT 1 that indicates whether one or more other ATs (e.g., ATs 3 . . . N) have actually joined the second group session. Based on the priority rules for AT 1, AT 1 can increase (or decrease) the priority level for the second group session based on which ATs have actually joined the second group session, as compared to the announce message that simply indicates the 'potential' call participants of the session. In this case, even if the announce message is insufficient to prompt the call target to switch calls, the additional knowledge that particular call participant(s) actually join the call may cause the call target to make the switch. A delay period can be defined by the call target during which supplemental information of this type will be taken into account to affect the priority for an announced call.

After determining the first and second priority levels in 530 and 535, respectively, AT 1 determines whether to switch from the first group session to the second group session based on the determined priority levels, 540.

Returning to 530 and 535, in a first example, at least one of the first and second priority levels can be determined from the priority profile based on an identification of an originator of the first and second group sessions, as illustrated in Table 1 (below):

TABLE 1

Example Priority Profile Based on Originator of Group Session for AT 1

| AT ID | Priority Level Value of Group Session if AT is Group Session Initiator |
|---|---|
| AT 1 | 2 |
| AT 2 | 1 |
| AT 3 | 3 |
| AT 4 | 0 |
| AT 5 . . . N | 3 |

In Table 1, a priority level value (e.g., wherein a lower number corresponds to a higher priority level) is associated with each of ATs 1 . . . N. Thus, if AT 1 was the originator for the first group session, the first priority level, or priority level value, determined in 530 is "2". Likewise, because AT 2 is known to be the originator of the second group session (e.g., because an identification of the group call or session originator is contained within the announce message), the second priority level, or priority level value, determined in 535 is "1". Accordingly, in this example, with respect to Table 1, the priority profile is based on the priority rule that an identification of a group call initiator or originator controls the priority level.

In a second example, instead of determining priority level values for each particular AT individually, a given group or class of ATs can be collectively associated with the same priority level or priority level value. For example, a domain name known to be associated with business associates (e.g., "Qualcomm", etc.) can be allocated a relatively high priority level value. Thus, if an originator of a group call can be associated with business associates, or otherwise as work related (e.g., based on an associated domain name), its determined priority level can be the higher priority level (e.g., wherein higher priority level corresponds to a more important priority level, or lower priority level value) among (i) the class-based priority level and (ii) the individual AT's priority level. Thus, if an especially important work contact (e.g., a boss, a CEO, etc.) is allocated a higher priority level than work contacts as a general class, the higher priority level is used as the priority level value.

TABLE 2

Example Priority Profile Based on Originator of Group Session for AT 1

| AT ID, or Class of Call | Priority Level of Group Session if AT is Group Session Initiator |
|---|---|
| AT 1 | 2 |
| AT 2 | 1 |
| AT 3 | 3 |
| AT 4 | 0 |
| AT 5 . . . N | 3 |
| Domain Name is Work Related | 1 |

In Table 2 (above), a priority level value (e.g., wherein a lower number corresponds to a higher priority level) is associated with each of ATs 1 . . . N, as in Table 1. However, Table 2 is further associated a give priority level value of "1" with any domain name of an originator that happens to be work related, or related to a class defined to include work contacts. Thus, the priority profile of Table 2 is based on the priority rule that an identification or class of a group call initiator or originator controls the priority level, with a lower priority level value (or higher priority level) being used in case priority level values are not consistent for an identified AT and that AT's associated class in the priority profile.

For example, if AT 4 is the CEO of AT 1's company and belongs to a class ("Domain Name is Work Related" in Table 2), AT 4's class-related priority level value is "1". However, AT 4's individual priority level value (e.g., because he/she is the CEO) in Table 2 is "0". Thus, the priority level value of "0" would be used in this case, because "0" has a higher priority level than "1".

In a third example, the identity or class of the group call initiator or originator need not be the only factor considered in determining the priority level associated with a given group session. For example, one or more target ATs belonging to the group associated with a group session can be factored into the priority level determination of 530 and/or 535. For example, the identifications of the target ATs can be based on an indication of which targets are invited to join the group session, which can be conveyed to AT 1 by information included within the announce message of 525 for the second group session in an example (or in an earlier announce message not illustrated in FIG. 5 for the first group session). Alternatively, a separate out-of-band message can be used to convey the identifications of one or more target ATs for either group session. Alternatively, the identifications of the target ATs can be based on which target ATs have actually joined either group session. In a further example, a given AT, or class of ATs, may have a different priority level when determined to be a target AT than when determined to be a group call initiator or originator. An example of this is illustrated in Table 3 (below), as follows:

TABLE 3

Example Priority Profile Based on Originator
or Target of Group Session for AT 1

| AT ID, or Class of Call | Priority Level of Group Session if AT is Group Session Initiator | Priority Level of Group Session if AT is Target AT |
|---|---|---|
| AT 1 | 2 | N/A |
| AT 2 | 1 | 2 |
| AT 3 | 3 | 4 |
| AT 4 | 0 | 1 |
| AT 5 . . . N | 3 | 4 |
| Domain Name is Work Related | 1 | 2 |

As shown in Table 3 (above), the priority levels associated with ATs or classes of ATs are lower than when the ATs or classes of ATs are target ATs as compared to when the ATs or classes of ATs are group call initiators of originators. For example, assume that the second group session in FIG. 5 is announced with AT 2 as call initiator, where AT 2 does not belong to class ("Domain Name is Work Related"), with ATs 1 and 5 as target ATs, and AT 5 belongs to class ("Domain Name is Work Related"). AT 2's priority level value as originator is "0", AT 5's individual priority level value as target is "4" and AT 5's class priority level value as target is "2". Accordingly, in this example, the second priority level is "0", as "0" is the highest qualifying priority level value for the second group session within the priority profile.

While Table 3 shows this initiator vs. target relationship as a simple offset of 1 (e.g., target AT priority level value=AT as initiator priority level value+1), it will be appreciated that other relationships are possible. For example, because target ATs are not guaranteed to actually participate in a group call when the group call is announced, the priority level associated with a target AT can be offset or adjusted from its corresponding call initiator priority level by a probability or expectation that the target AT will actually participate in the group call (e.g., based on a history of the target AT's acceptance rate, or alternatively based on a default expectation level). Thus, the priority profile of Table 3 is based on the priority rule that the highest priority level (or lowest priority level value) associated with a group call based on the call initiator (e.g., AT ID or class) or a highest-prioritized call target (e.g., AT ID or class) is used as the priority level for the group session.

In another alternative example, instead of relying on a probability or expectation that a target AT will join an announced group session, AT 1 can refrain from joining the group session initially and send periodic status update requests to obtain a listing of ATs actively participating in an announced group session. In this example, target ATs are either given no consideration, or alternatively are given less consideration, before the target ATs actually join the group session.

In a fourth example, additional criteria aside from AT IDs or a class associated with a group call originator or target AT for the group call can be configured to affect the priority level. Calendar information, for instance, can be taken into consideration, for example, to adjust a class associated with work contacts by granting the work contacts a higher priority (or lower priority level value) during work hours (e.g., M-F, 9 am-5 pm) and granting the work contacts a lower priority during night and weekend hours (e.g., unless a particular work contact has a separate, higher priority level for the AT aside from the class priority level, which can designate a work associate who is also a close friend, in an example). In yet another example, location information (e.g., based on sector or subnet identifier, based on a satellite positioning system (SPS) measurement such as GPS, etc.) (e.g., of the group call originator, of one or more target ATs, of the AT that has received the announce message, etc.) can affect the priority level.

In a fifth example, as noted above, AT 1 may dynamically calculate the priority levels in 530 and/or 535, instead of and/or in addition to storing fixed priority values in local memory. For example, assume that the first group session initially has a priority level of "2" as determined in accordance with any of the preceding examples. For example, for one reason or another, the first group session may become more important and the user of AT 1 may increase the priority level for the first group session to "1" or "0" (e.g., an old friend having a low priority level may call a user of AT 1 and bring up an intriguing business deal). Alternatively, the first group session may become less important and the user of AT 1 may decrease the priority level for the first group session to "3" or "4" (e.g., after discussing important business with the user of AT's accountant, the account begins to an irrelevant conversation). In either case, it will be appreciated that the initial priority level associated with the first group session need not be the priority level determined in 530. Rather, based on user input regarding the on-going importance of the first group session, the priority level in 530 can be adjusted or dynamically calculated. Likewise, after switching to the second group session, user input can again be used to dynamically calculate or adjust the second priority level, and so on.

While some of the examples given above shown that an access terminal can have different priorities based the identification of a call participant and whether the call participant is a target of the session or an originator of the session, in another embodiment of the invention, call acceptance is an additional parameter that can affect the priority of a particular call. For example, in a call to a large group, one particular call invitee may have a higher priority than other call participants. The fact that the high-priority call invitee is invited to the session grants the session a relatively high-priority. In other words, the speculative possibility that the high-priority call invitee will actually accept the call means the call 'could' be important. As will be appreciated, if the high-priority call invitee actually accepts the call and joins in, the call can take on an even higher-priority as compared to when the attendance of the high-priority call invitee was merely speculative. As will be appreciated, whether the high-priority call invitee will actually accept the call will not generally be known when the announce message is sent out, because the high-priority call invitee will likely be receiving the announce message contemporaneously with the access terminal evaluating the call priority.

For example, assume that A is currently in call X, and A gets an invite to call Y from B, and further assume that call Y is known to include C as a potential call participant (or invitee). In this case, A may only want to auto-accept call Y and abandon call X if A can confirm that C has accepted and actually joined call Y. Thus, until A is informed by the application server 170 that C has joined the call, A will remain in call X. This example demonstrates that certain conditions can delay a switch to a newly announced call in the event that more information is required to evaluate the particular call-switching rules for the user. This example also assumes that A's rule is conveyed to the application server 170 so the application server 170 knows that a supplemental notification of C's call joinder is required to be sent to A for A to make the call-switch determination.

Accordingly, it will be appreciated that many different priority rules can be used to form the priority profile for a given AT ("AT 1") that is used to determine the relative priority levels associated with a current or active group session (i.e., the first group session) and a later announced group session (i.e., the second group session). As noted above, any priority consideration in group calls (e.g., PTT, PTX and/or BCMCS calls) used to determine whether to automatically accept or switch between group calls provides more flexibility than a mechanism that simply auto-rejects group calls after AT 1 joins a group session.

Returning to FIG. 5, AT 1 determines whether to switch from the first group session to the second group session based on the first and second priority levels determined in 530 and 535, respectively. For example, if a priority level value associated with the first priority level value of the first group session is less than or equal to a priority level value associated with the second priority level of the second group session, AT 1 determines not to switch from the first group session to the second group session in 540, and the process returns to 500 and AT 1 continues to participate (e.g., monitor) in the first group session (i.e., because the second group session does not have a superseding priority over the first group session). In another example, if a priority level value associated with the first priority level of the first group session is higher than a priority level value associated with the second priority level of the second group session, AT 1 determines to switch from the first group session to the second group session in 540 (i.e., because the first group session has a higher priority than the first group session).

Accordingly, if AT 1 determines to switch from the first group session to the second group session in 540, AT 1 stops monitoring the first group session, 545, and sends one or more messages to the RAN 120, 550, that indicate an acceptance of the second group session (e.g., an ANNOUNCE ACK for the application server 170) and a registration (e.g., a BCMCS-FlowRegistration Message if the group session is supported by IP multicasting protocols) to the second group session. In an example, the ANNOUNCE ACK and registration messages can be bundled within a single reverse link packet. In an alternative example, the ANNOUNCE ACK and registration messages can be transmitted to the RAN 120 in separate packets. Further, it will be appreciated that the TCH and QoS resources that are established for the first group session can be preserved for the second group session during the switch, such that AT 1 need not request new resources unless more resources are required for the second group session.

Assuming AT 1 is a first responder to the second group session at this point, upon receiving the ANNOUNCE ACK, the application server 170 sends a message instructing AT 2 to begin speaking, and AT 2 receives the message and plays a tone indicating to a user of AT 2 that the second group session has begun and the user can begin speaking, 555. Thus, in 555, the user of AT 2 begins speaking and relaying voice packets (e.g., or other data, as in a push-to-transfer (PTX) system that can transfer any type of digital data) to the application server 170, which in turn forwards the voice packets to the RAN 120 for transmission at least within AT 1's sector on the downlink BCH, 560. AT 1 monitors the downlink BCH and receives the group transmissions associated with the second group session, 565.

As will be appreciated in view of the above-description of FIG. 5, configuring an AT to determine whether to switch between group sessions or calls (e.g., based on priority levels determined by priority profiles for the ATs) permits more flexibility than auto-rejecting all announce messages after an AT is engaged in a group session, as well as providing a potentially faster switch-time if one or more of the ATs determines to switch between group sessions (e.g., without requiring manual user intervention at the AT).

In the embodiments of the invention described above, while the term "multicast" has been used to refer to certain types of communication sessions and signaling messages, this term has been used to correspond to any type of group call, and is not necessarily restricted to IP multicasting implementations of group calls. For example, a call between more than two ATs that communicate via unicast protocols can also be construed as a multicast call in other embodiments of the invention. Thus, a multicast or group call can be achieved either with IP multicasting protocols, or alternatively with multiple IP unicast sessions.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., access terminal). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of selectively switching from a first group session to a second group session within a wireless communications system, comprising:
    receiving an announce message at a given access terminal that announces the second group session when the given access terminal is participating in the first group session;
    acquiring one or more priority levels associated with one or more of the first and second group sessions;
    determining whether to switch from the first group session to the second group session based on the one or more priority levels; and
    selectively switching from the first group session to the second group session based on the determining step.

2. The method of claim 1, wherein the acquiring step includes:
    determining a first priority level associated with the first group session based on a priority profile of the given access terminal; and
    determining a second priority level associated with the second group session based on the priority profile of the given access terminal.

3. The method of claim 2, wherein the determining step determines to switch from the first group session to the second group session if the second priority level has a higher priority than the first priority level.

4. The method of claim 2, wherein the determination of the first priority level includes:
    identifying an access terminal identifier of an originator of the first group session; and
    obtaining, from the priority profile, the first priority level as a priority level associated with the access terminal identifier of the originator.

5. The method of claim 4, wherein the access terminal identifier identifies the given access terminal.

6. The method of claim 2, wherein the determination of the first priority level includes:
    identifying a class of access terminals to which an originator of the first group session belongs; and
    obtaining, from the priority profile, the first priority level as a priority level associated with group sessions originated by access terminals belonging to the class of access terminals.

7. The method of claim 2, wherein the determination of the first priority level includes:
    identifying an access terminal identifier of at least one target access terminal of the first group session; and
    obtaining, from the priority profile, the first priority level as a priority level associated with the access terminal identifier as a target access terminal.

8. The method of claim 7, wherein the access terminal identifier identifies the given access terminal.

9. The method of claim 2, wherein the determination of the first priority level includes:
    identifying a class of access terminals to which at least one target access terminal of the first group session belongs; and
    obtaining, from the priority profile, the first priority level as a priority level associated with group sessions targeted to access terminals that belong to the class of access terminals.

10. The method of claim 2, wherein the determination of the second priority level includes:
    identifying an access terminal identifier of an originator of the second group session; and
    obtaining, from the priority profile, the second priority level as a priority level associated with the access terminal identifier being the originator of the second group session.

11. The method of claim 2, wherein the determination of the second priority level includes:
    identifying a class of access terminals to which an originator of the second group session belongs; and
    obtaining, from the priority profile, the second priority level as a priority level associated with group sessions originated by access terminals belonging to the class of access terminals.

12. The method of claim 2, wherein the determination of the second priority level includes:
    identifying an access terminal identifier of at least one target access terminal of the second group session; and
    obtaining, from the priority profile, the second priority level as a priority level associated with the access terminal identifier as a target access terminal.

13. The method of claim 12, wherein the identifying step extracts the access terminal identifier of the at least one target access terminal from the received announce message or from an out-of-band message separate from the received announce message.

14. The method of claim 2, wherein the determination of the second priority level includes:
- identifying a class of access terminals to which at least one target access terminal of the second group session belongs; and
- obtaining, from the priority profile, the second priority level as a priority level associated with group sessions targeted to access terminals that belong to the class of access terminals.

15. The method of claim 2, wherein the priority profile includes a first set of priority level values for access terminal identifiers or classes of access terminals that correspond to an originator of a given group session, and a second set of priority level values for the access terminal identifiers or the classes of access terminals that correspond to a target access terminal of a given group session.

16. The method of claim 15, wherein lower priority level values correspond to higher priority levels, and wherein the second set of priority level values are greater than or equal to corresponding entries within the first set of priority level values.

17. The method of claim 15, wherein, if the given group session is associated with multiple priority level values within the priority profile, a priority level value associated with a highest level of priority among the multiple priority level values is used as the priority level for the given group session.

18. The method of claim 1, wherein the selectively switching step is performed automatically by the given access terminal without intervention by a user of the given access terminal.

19. The method of claim 1, wherein the acquiring step acquires the one or more priority levels based on information stored in memory at the given access terminal, from a network entity external to the given access terminal, from a dynamic calculation performed at the given access terminal or the external network entity or a combination thereof.

20. The method of claim 19, wherein the dynamic calculation of the one or more priority levels is based on user input received at the given access terminal relevant to a priority level of the first group session.

21. The method of claim 20, wherein the user input indicates that the first group session has increased or decreased in importance.

22. The method of claim 1, further comprising:
- receiving a notification, after the announce message is received, that indicates that one or more access terminals other than an originator of the second group session has joined the second group session,
- wherein the acquiring step is based at least in part upon the indication that the one or more access terminals has joined the second group session.

23. The method of claim 1, wherein the acquiring step acquires a higher-priority level for the second group session when the one or more access terminals are determined to have joined the second group session as compared to when acceptance of the second group session by the one or more other access terminals is speculative.

24. An access terminal configured to selectively switch from a first group session to a second group session within a wireless communications system, comprising:
- means for receiving an announce message at the access terminal that announces the second group session when the access terminal is participating in the first group session;
- means for acquiring one or more priority levels associated with one or more of the first and second group sessions;
- means for determining whether to switch from the first group session to the second group session based on the one or more priority levels; and
- means for selectively switching from the first group session to the second group session based on the determination.

25. An access terminal configured to selectively switch from a first group session to a second group session within a wireless communications system, comprising:
- logic configured to receive an announce message at the access terminal that announces the second group session when the access terminal is participating in the first group session;
- logic configured to acquire one or more priority levels associated with one or more of the first and second group sessions;
- logic configured to determine whether to switch from the first group session to the second group session based on the one or more priority levels; and
- logic configured to selectively switch from the first group session to the second group session based on the determination.

26. A non-transitory computer-readable storage medium comprising instructions, which, when executed by an access terminal configured to selectively switch from a first group session to a second group session within a wireless communications system, cause the access terminal to perform operations, the instructions comprising:
- program code to receive an announce message at the access terminal that announces the second group session when the access terminal is participating in the first group session;
- program code to acquire one or more priority levels associated with one or more of the first and second group sessions;
- program code to determine whether to switch from the first group session to the second group session based on the one or more priority levels; and
- program code to selectively switch from the first group session to the second group session based on the determination.

* * * * *